(12) United States Patent
Gulcu et al.

(10) Patent No.: US 6,925,562 B2
(45) Date of Patent: Aug. 2, 2005

(54) SCHEME FOR BLOCKING THE USE OF LOST OR STOLEN NETWORK-CONNECTABLE COMPUTER SYSTEMS

(75) Inventors: Ceki Gulcu, Lausanne (CH); Patrick Droz, Rueschlikon (CH); Robert Haas, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 09/738,559

(22) Filed: Dec. 15, 2000

(65) Prior Publication Data

US 2002/0016838 A1 Feb. 7, 2002

(30) Foreign Application Priority Data

Dec. 17, 1999 (EP) ............................................ 99811169

(51) Int. Cl.[7] ................................................. H04L 9/00
(52) U.S. Cl. ....................... 713/172; 713/155; 713/165; 713/193; 380/231; 380/233; 705/51; 705/52
(58) Field of Search ................................. 713/193, 172, 713/155, 165; 380/233, 231; 705/51, 52

(56) References Cited

U.S. PATENT DOCUMENTS

| | | | | |
|---|---|---|---|---|
| 4,650,975 A | * | 3/1987 | Kitchener | .................. 235/375 |
| 5,634,012 A | * | 5/1997 | Stefik et al. | .................. 705/39 |
| 5,638,443 A | * | 6/1997 | Stefik et al. | .................. 705/54 |
| 5,943,423 A | * | 8/1999 | Muftic | ......................... 705/67 |
| 2005/0060693 A1 | * | 3/2005 | Robison et al. | ............. 717/143 |

* cited by examiner

*Primary Examiner*—Norman M. Wright
(74) *Attorney, Agent, or Firm*—Thomas A. Beck; Louis P. Herzberg

(57) ABSTRACT

Scheme for switching a computer system (21), which is connectable via a communication interface and a network (22) to a server module (23), into a special mode of operation. The computer system (21) comprises a software component (26) for sending an identifier (w) assigned to the computer system (21) via the communication interface and the network (22) to the server module (23). In response, the software component (26) receives a token (S), issued by the server module (23), whereby the token (S) comprises a credit (C). In addition, the computer system (21) comprises a trusted hardware component (25) storing the identifier (w) and comprising a credit counter (44) with a credit which is automatically exhaustible step-by-step, and which is updateable with the credit (C) received from the server module (23). The computer system (21) has a trigger unit for switching the computer system (21) into the special mode of operation, e.g. a mode where the computer system (21) is of limited use to a user, if the credit of the credit counter is exhausted.

45 Claims, 7 Drawing Sheets

SCHEME FOR BLOCKING THE USE OF LOST OR STOLEN NETWORK-CONNECTABLE COMPUTER SYSTEMS

TECHNICAL FIELD

The invention concerns a scheme for protecting network-attachable computer systems that are reported stolen or lost. The present invention can be used in any kind of computer system that can be connected to a network.

BACKGROUND OF THE INVENTION

Computer systems have become dramatically smaller and more portable. Personal computers and peripherals are small enough to sit on the desk at work. Smaller still are lap top computers and notebook computers. There are computer terminals which are small enough to be mounted in a vehicle such as a delivery truck. Still smaller are the hand held terminals typically used for their portability features where the user can carry the terminal in one hand and operate it with the other.

Many of today's computer systems can be hooked up to the Internet or the World Wide Web (WWW) being a part of the Internet. There are also computer systems that are solely used inside a protected area, such as a local network that is not connected to the outside world, or an intranet fenced off from the outside world by means of firewalls or the like. More and more of these computer systems draw at least part of their functionality from the network, such as the Internet, WWW, intranet, or local network.

A connection to the network can be established using Ethernet, Token Ring, or other wire based or fiber based schemes. Details and implementations of these schemes are well known in the art and are thus not addressed herein in detail.

Likewise, wireless ad-hoc connections schemes (e.g. body networks, radio frequency connections, or infrared connections) can be used to hook up a computer system to a network. Ad-hoc connections are required where devices move around, enter an area and exit the area. The term ad-hoc refers to the need for frequent network reorganization.

There are different wireless communications approaches known that have been developed and designed with an eye on the communication between peers or subsystems of such wireless ad-hoc networks. Typical examples are addressed in the following.

GTE Corporation has developed a short-range radio-frequency (RF) technique which is aimed at giving mobile devices such as cellular phones, pagers and handheld personal computers (PCs) a smart way to interact with one another. GTE's technique is tentatively named Body LAN (local area network). The original development of Body LAN was via a wired vest with which various devices were connected (hence the name Body LAN). This graduated to an RF connection a couple of years ago.

Xerox Corporation has developed a handheld computing device called PARC TAB. The PARC TAB is portable yet connected to the office workstation through base stations which have known locations. The PARC TAB base stations are placed around the building, and wired into a fixed wired network. A device can thus be connected through the PARC TAB base station to the Internet or WWW.

In an attempt to standardize data communication between disparate PC devices several companies, including Ericsson, IBM, Intel, Nokia, and Toshiba established a consortium to create a global standard for wireless RF-based connectivity between fixed, portable and mobile devices. There are many other adopter companies. The proposed standard comprises an architecture and protocol specifications ranging from the physical layer up to the application layer. Enabling seamless voice and data transmission via wireless, short-range radio, the Bluetooth technology will allow users to connect a wide range of devices easily and quickly, without the need for cables, expanding communications capabilities for mobile computers, mobile phones and other mobile devices. The Bluetooth operating environment is not yet fully defined, but there are expected to be similarities with the IrDA (Infrared Data Association) specification and the Advanced Infrared (AIr) specification. Other aspects that probably will find their way into Bluetooth might stem from the IEEE standard 802.11 and/or HIPERLAN, as promulgated by the European Telecommunications Standards Institute (ETSI).

Bluetooth radio technology provides a mechanism to form small private ad-hoc groupings of connected devices away from fixed network infrastructures. A link to a fixed network, such as the Internet or WWW might be provided. Further details can be found in Haartsen, Allen, Inouye, Joeressen, and Naghshineh, "Bluetooth: Vision, Goals, and Architecture" in the Mobile Computing and Communications Review, Vol. 1, No. 2. Mobile Computing and Communications Review is a publication of the ACM SIGMOBILE.

HomeRF (based on Shared Wireless Access Protocol (SWAP)) is another example of an operating environment which can be used to connect devices. A HomeRF Working Group was formed to provide the foundation for a broad range of interoperable consumer devices by establishing an open industry specification for wireless digital communication between PCs and consumer electronic devices anywhere in and around the home. The working group, which includes the leading companies from the personal computer, consumer electronics, peripherals, communications, software, and semiconductor industries, is developing a specification for wireless communications in the home called the SWAP. The HomeRF SWAP system is designed to carry both voice and data traffic and to interoperate with the Public Switched Telephone Network (PSTN) and the Internet or WWW; it operates in the 2400 MHz band and uses a digital frequency hopping spread spectrum radio. The SWAP technology was derived from extensions of existing cordless telephone (DECT) and wireless LAN technology to enable a new class of home cordless services. It supports both a time division multiple access (TDMA) service to provide delivery of interactive voice and other time-critical services, and a carrier sense multiple access/collision avoidance (CSMA/CA) service for delivery of high speed packet data. The SWAP system can operate either as an ad-hoc network or as a managed network under the control of a connection point. In an ad-hoc network, where only data communication is supported, all stations are equal and control of the network is distributed between stations. For time critical communications such as interactive voice, the connection point—which provides the gateway to the PSTN—is required to coordinate the system. Stations use the CSMA/CA to communicate with a connection point and other stations. Further details about HomeRF can be found at the Home Radio Frequency Working Group's web site http://www.homerf.org. The SWAP specification 1.0 is incorporated by reference in its entirety.

It is a well known problem that computer systems, and in particular portable computers, are expensive and thus tempting to steal. There is also the likelihood that such devices get lost or that the owner or user forgets a device when traveling, for example. The same applies to rental cars, cellular phones and many other devices.

There are a few protection mechanisms, like passwords, that are not widely used because of the added burden they impose on the user. Password protection only works on devices that have some means to key in the password. An alternative to password-protection is to use a dedicated central registry on a network where devices periodically send "hello" messages together with their own address, in order to track stolen or lost devices. This alternative is vulnerable to firewalls because the "hello" messages going to the central registry can easily be intercepted by a firewall filter, since the central registry's well-known address must be carried in these "hello" messages.

A known protection scheme is described in the International patent application with publication number WO 98/04967, Peter Collins et al., as published on 5 Feb. 1998. The protection scheme disclosed in this patent application is based on the known challenge response protocol. In Collins et al. a shared secret key is used that is only known to the client and the server. It is a disadvantage of this shared key approach that the number of shared keys goes up when the number of clients increases. All these shared secret keys have to be generated and distributed which puts some burden on the system. The protection scheme of Collins et al. requires each client to run a timer. If no response is received from the server in due course, then the client shuts down. Furthermore, Collins et al. have to define in the client how often it sends a challenge to the server. It is another disadvantage of Collins' approach that an intruder or hacker can extract the part number or unique identifier which is sent from the client to the server. This can be done using a sniffer, for example. The user's privacy is thus not adequately protected.

Another protection scheme is described in the International patent application with publication number WO 96/15485, Christian Cotchini et al., as published on 23 May 1996. This protection scheme makes use of a modem that is used on the telephone network to allow the client to periodically call a remote server. The client's serial number is reported to the server via an encoded series of dialed numbers. The server only accepts calls from clients on a predefined list. If the call comes from a stolen client, then the client's caller ID might be used to locate it. This scheme is secretly and transparently embedded in the client. Such a scheme cannot be used in data network such as the Internet.

Yet another protection scheme is described in "ThinkPad Tracking", Sharon Nash, PC MAGAZINE, 23 Mar. 1999, p. 29. According to this publication, IBM started to ship notebook computers with an Asset ID, a security technology designed to protect notebook computers.

The Asset ID technology combines a radio frequency (RF) tag and an RF scanner to allow notebooks to be registered in a company's inventory. If a notebook is removed without authorization through a door protected by an RF sensor, the respective notebook becomes automatically password-protected. The Asset ID security technology enables customers to track and protect computer systems, ensuring that the assets are in the hands of those responsible for their use. Asset ID is the result of a joint development effort between HID Corporation, IBM Corporation, and Atmel Corporation. (Asset ID is a trademark of IBM Corporation).

Software-based theft protection schemes, like the one described in the above-discussed International patent application with publication number WO 96/15485, can be removed or disabled by the astute adversary. Once a patch bypassing a software-based scheme is available, it will be widely disseminated in a short time.

On the other hand, a hardware-based protection scheme suffers from high complexity and price.

It is an object of the present invention to provide a scheme enabling the protection of a lost or stolen computer system.

It is an object of the present invention to provide systems enabling the protection of a lost or stolen computer system.

SUMMARY OF THE INVENTION

The present invention concerns a scheme for the protection of lost or stolen computer systems. It relies on credits and lists (such as black-lists, valid lists, customized credit lists, or a combination thereof), where a protected computer system requests new credits from a server module in order to be able to continue operating normally. In return it gets a token (e.g., a signed token) from the server module. This token contains credit information which allows the protected computer system to operate normally for a while. The protected computer system may ask for a fresh credit from time to time. In case the credit is exhausted, the computer system is no longer allowed to operate in its regular mode of operation.

A computer system, according to one embodiment of the present invention, comprises a communication interface for connecting the computer system via a network to a server module. In addition, the computer system comprises a software component for sending an identifier (w) assigned to the computer system via the communication interface and the network to the server module, and for receiving a token (S), issued by the server module. This token (S) comprises a credit (C). A trusted hardware component is also part of the computer system. This trusted hardware component comprises a credit counter with a credit which is automatically exhaustible step-by-step and which is updateable with the credit (C) received from the server module. Furthermore, there is a trigger unit for switching the computer system into a special mode of operation if the credit counter's credit is exhausted.

A server module, according to one embodiment of the present invention, comprises a list or an access to a list with identifiers and the corresponding cryptographic keys of lost or stolen computer systems, and a network interface for connecting the server module via a network to a computer system. The server module receives an identifier (e.g., a secure identifier comprising the computer system's identifier (w) encrypted by a cryptographic key (k)). The server module receives the computer system's identifier (w) and compares this identifier with a black-list to determine whether this identifier (w) is on said list. If the identifier is on said black-list, then the server module assumes that the respective computer system was reported lost or stolen. The server module then decides not to grant any credit to the respective computer system. There are different ways to do this, as will be addressed in the detailed description.

Furthermore, the present invention concerns a method for switching a computer system into a special mode of operation if its credit is exhausted. The present invention also concerns a method for granting credits to computer systems that are not reported lost or stolen.

The present invention also concerns computer program products and computer program elements implementing aspects of the inventive scheme.

The present scheme relies on an important observation:

High-tech devices (herein called computer systems) usually cannot be easily dismantled into spare parts without loosing a considerable value. Therefore, a mechanism protecting the central piece of the computer system (like the motherboard) is a strong enough deterrent against theft. If needed, other expensive pieces that can be easily separated from the central piece (like graphic adapter cards, network interface cards, CPUs or modems) can be protected independently using the present scheme.

It is an advantage of the present scheme that by combining a trusted hardware component and an untrusted software component a tamperproof implementation can be obtained that more secure than known approaches. Any protection scheme that relies purely on software can be more easily tampered. A hybrid computer system with a trusted hardware component and an untrusted software component offers maximum flexibility while keeping the hardware requirements simple.

It is a strength of the present scheme that it is resistant to attackers. Furthermore, it guarantees privacy and it is scalable.

DESCRIPTION OF THE DRAWINGS

The invention is described in detail below with reference to the following schematic drawings. It is to be noted that the Figures are not drawn to scale.

DESCRIPTION OF PREFERRED EMBODIMENTS

Figure 1:
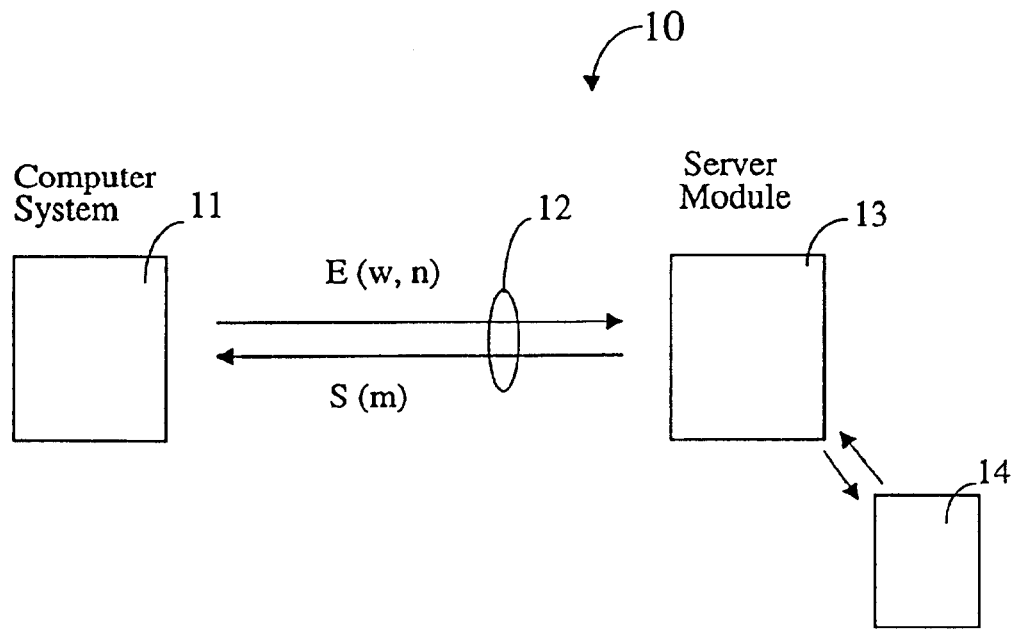
FIG. 1 is a schematic block diagram used to describe the basic concept of the present invention.

The present scheme can be used in wireless networks, wire-based networks or fiber-based networks which are deployed in warehouses, on manufacturing floors, in offices, on trading floors, in private homes, in cars and trucks, in airplanes, and outside of buildings, just to mention some examples. Any kind of network, including the Internet and the world wide web (WWW), is meant when herein referring to a network. Simple point-to-point links or point-to-multipoint links are also meant to be covered by the word network.

When referring to a computer system, any kind of device is meant that can be attached or hooked up to a network. Examples of computer systems are: laptop computers, workpads, nodepads, personal digital assistants (PDAs), notebook computers and other wearable computers, desktop computers, computer terminals, networked computers, internet terminals and other computing or networking systems like bridges, switches, routers, and set-top boxes, cash registers, bar code scanners, point of sales terminals, kiosk systems, cellular phones, pagers, wrist watches, digital watches, badges, and smart cards. Other contemplated devices include: headsets, Human Interface Device (HID) compliant peripherals, data and voice access points, cameras, printers, fax machines, keyboards, joysticks, HiFi systems, audio (sound) cards, loudspeakers, amplifiers, video cards, kitchen appliances, tools, sensors such as smoke and/or fire detectors, and virtually any other digital device.

Other examples of wearable computers that can be used in connection with the present invention are, personal effects being equipped with computer-like hardware, such as a "smart wallet" computer, jewelry, or articles of clothing. In addition to a "smart wallet" computer, there are a number of other variations of the wearable computers. A "belt" computer is such a variation which allows the user to surf, dictate, and edit documents while they are moving around. Yet another example is a child's computer which is comparable to a personal digital assistant for grade-school children. The child's computer might hold assignments, perform calculations, and help kids manage their homework. It can interface with other children's computers to facilitate collaboration, and it can access a teacher's computer to download assignments or feedback. Any wearable or portable device, any office tool or equipment, home tool or equipment, system for use in vehicles, or systems for use in the public (vending machines, ticketing machines, automated teller machines, etc.) might comprise the present invention.

For the purpose of the present invention also cars, trucks, and any other vehicle that comprises kind of a computer system are considered to be a computer system in the broadest sense. In other words, the present invention can also be employed to discover and, if desired, track down stolen vehicles.

It is furthermore assumed that a computer system, as used in connection with the present invention, has a minimum amount of processing power that enables it to communicate with a network. These computer systems are thus herein referred to as network-attached (or network-attachable) computer systems. The network-attached computer system needs to be able to transmit information to a network and/or receive information from a network. For this purpose it comprises a communication interface (e.g., a transmitter, receiver, and some protocol stack to support and enable the exchange of information via a network).

A server module, as employed in connection with the present invention, can be a dedicated server or a module within a server, a computer system connected to a network, or a switch, router, bridge or any other network device which has some processing power that enables it to communicate via a network with a computer system and to perform the steps of the present invention. A farm of computer systems can be employed as server module. This server module can be managed by any appropriate entity and not necessarily the current user of a protected computer system. The server module can for example be operated and managed by an independent authority. The server module needs to be able to transmit information to a network and/or receive information from a network. For this purpose it comprises a network interface (e.g., a transmitter, receiver, and some protocol stack to support and enable the exchange of information via a network).

Identifier: A key element of the present invention is an identifier w. Any kind of identifier w can be used to identify the computer system to a server module. Ideally, the identifier w is unique within the network. The identifier w can be set by the manufacturer who makes the computer system or the store where the system is sold, for example. One may for example use a so-called Asset ID (Asset identifier), as provided by the ATMEL MSC0402 chip made by Atmel Corporation.

Secure Identifier: The identifier w is encrypted before leaving the computer system's trusted hardware, e.g. for being transmitted via a network to a server module. The encrypted identifier is herein referred to as secure identifier E(w). The word secure is used herein to indicate that the identifier w cannot be changed or acted upon by a non-authorized person or system.

One may use a secure identifier E(w) which is optimized so that the transmission across the network is efficient. In addition to the identifier w, the secure identifier E(w) might comprise a time stamp and other information, e.g., an unpredictable random sequence of bits n, or an ever increasing or decreasing number n, or a nonce n. This time stamp or other information is for sake of simplicity herein referred to as additional information n.

If the secure identifier carries the identifier w and additional information n, for instance, then this is denoted as E(w,n).

In order to generate the secure identifier E(w), the identifier w is encrypted using a cryptographic key k. This step is also referred to as encryption step. The computer system may take the server module's public cryptographic key and use it to encrypt its identifier w before sending it across the network. There are many other ways for the encryption of the identifier w. Instead of a public key encryption approach one may use a shared secret key approach, for example.

Cryptographic key: Since the identifier w is encrypted using a cryptographic key k (e.g., the server module's public cryptographic key) prior to its transmission to the server module, the server module—according to the present invention—needs a corresponding cryptographic key (e.g., a secret (private) cryptographic key) in order to be able to decrypt the received secure identifier E(w,n). The cryptographic key k for encryption of the identifier w can be a public cryptographic key and the cryptographic key for decryption of the received secure identifier E(w,n) can be a private cryptographic key as used in connection with known public key cryptography. Preferably, nobody should have access to the cryptographic key k for encryption of the identifier w in combination with the computer system's identifier w.

Public key cryptography: A method for creating two keys (also called a key pair) that can be used to encrypt and decrypt messages. One of the two keys, the public key, is widely published, while the other key, the private key is kept secret. If one wants to encrypt a message for a recipient, one uses that recipient's public key; only someone with the private key can decrypt the message. If one wants to digitally sign a message, one uses the private key; anyone with the corresponding public key can then check the signature and verify that only a 'trusted' party could have signed the message.

Trusted hardware component: A trusted hardware component is a component (e.g., a chip or a chip set) that meets certain security standards to prevent unauthorized access or modification. In other words, a trusted hardware component is a component that is protected in order to be tamperproof.

Network topology: The present scheme can be used in connection with any kind of network which at least allows the computer system to send information to a server module. The network topology is lower-level than the subject of the present invention. Aspects of the network topology are only addressed to the extent necessary, i.e., the present invention is independent of the network topology.

Network technology: The present scheme can be used in connection with any kind of network technique, such as Ethernet, Token Ring, ATM, RF, IR, and the like.

Transmission of Identifier: An example of a scheme for transmission of the identifier w is now addressed. A computer system can send from time to time, e.g., at random or regular intervals, its secure identifier E(w) to a specific server module which is reachable via a network. The transmission could also be carried out each time the computer system is connected to a network, for example. The address or identity of this server module (server module address) can be kept inside said computer system in form of an address list, for example. The DNS (Domain Name System) information of server modules could for example be hard-coded inside the computer system's hardware. Likewise, it might be provided in a file or in a hard disk partition of the computer system. If no address is provided in the computer system, the address can be learnt dynamically on-the-fly. There are networks where the computer system does not need the server module's address in order to be able to send the secret identifier to it (broadcasting, layer 4 routing, etc.).

The present invention is independent of the scheme for transmission of the identifier. What is required is that a computer system, according to the present invention, announces its identity w by sending a secure identifier E(w) to a specific server module. How this is done and how often the transmission is repeated is implementation dependent.

Before addressing detailed embodiments of the invention, the underlying scheme is addressed and additional terms are defined. A typical network system 10 is illustrated in FIG. 1. There is a computer system 11 (e.g., a notebook computer) which is connected via a network 12 to a server module 13. For sake of simplicity the network 12 is represented in form of two simple arrows because the structure, type, and size of the actual network is not of relevance. In other words, any kind of network 12 can be used to link the computer system 11 to a server module 13. The computer system 11 either comprise the address of a server module 13 or it is linked to the server module 13 in a fashion that no specific address is required (broadcasting, layer 4 routing, etc.). An identifier w and a cryptographic key k is available at the computer system 11. From time to time, the computer system 11 transmits its secure identifier E(w) to the server module 13. To allow a verification of the computer system 11 by the server module 13, the identifier w is encrypted using the cryptographic key k, as indicated by the expression E(w), before its transmission. This is important because otherwise an unauthorized third party (e.g., an intruder or hacker) could misuse the identifier w of a specific computer system. Such a misuse can be prevented if the identifier w is encrypted using a cryptographic key k.

The server module 13 comprises a cryptographic key for decryption (e.g., a secret (private) key) of the secure identifier E(w), or it has access to a list with the cryptographic key for decryption.

If the server module 13 receives a secure identifier E(w) it decrypts it to obtain the identifier w. Note that if additional information n is sent together with the identifier as secure identifier E(w,n), then the server module 13 decrypts this secret identifier E(w,n) to obtain the identifier w and the additional information n.

The server module 13 either comprises a list 14, e.g. a 'black list', or it has access to such a list where the identifiers of computer systems 11 are listed that are reported lost or stolen. The module 13 now compares the identifier w with the entries in the black list 14 to check whether there is a matching identifier listed. If the computer system's identifier is listed on the black list 14 this means that the computer system 11 which transmitted the secure identifier E(w,n) was lost or stolen. If the computer system's identifier is not listed, then it is assumed that everything is in good order, i.e. the secure identifier E(w,n) was issued by a computer system 11 that was neither reported lost nor stolen.

Based on the comparison with entries in the black list 14 the server module 13 now decides, e.g. by taking into consideration certain predefined rules, whether to grant the computer system 11 any credit C, and, if it decides to grant credit C, how much credit C it grants. The server module may keep state information in order to be able to control at a later point in time, e.g. when it receives another request for credit from a particular computer system, whether it has previously granted any credit to this particular computer system and/or how much credit it has granted. Note that the keeping of state information is optional.

The credit can be a simple number representing a credit amount, or a token that tells the computer system that it can run for a certain period of time, or a pointer to a table or memory where a credit amount is stored. Other schemes for granting the computer system a credit are conceivable. The server module 13 dynamically controls or changes the computer system's operation by sending the credit information.

As shown in FIG. 1, the server module 13 returns the information S(m) to the computer system 11. S(m) denotes a message m and the server module's digital public key signature on the message m. The digital signature on message m is obtained by encrypting a hash of m using a cryptographic key, e.g. the server module's private key. This digital signature is employed to prove that the server module as holder of the cryptographic key is the originator of a message S(m). If the signature is successfully verified then the computer system can trust the server module. A trusted server module is a server that is known to the computer system. For this purpose the computer system may contain a list of server modules, for example. This list may comprise the public keys of the trusted server modules.

The message m represents the identifier w and the credit C. If additional information n was transmitted in the secure identifier—as denoted by E(w,n)—then this additional information n is also returned to the computer system 11 in the message m. I.e., in this case, the message m represents the identifier w, the additional information n, and the credit C. This is denoted by S(w,n,C).

The computer system 11 receives S(m). It now uses its cryptographic key k to decrypt S(m). Since the computer system 11 knows its own identifier w, it is able to determine whether S(m) was sent by the server module 13 and whether this server module 13 is a 'trusted' server module.

If the message S(m) came from a trusted server module, then the computer system can extract/derive the credit C. Depending on the actual implementation, the computer system 11 can now use the credit C to update a credit counter. Such a credit counter can be implemented in different ways: Either (1) it is implemented as a counter which decreases its credit amount over time, or (2) it is implemented as a counter which increases its credit amount over time. In case (1) the credit C may be a positive number, preferably an integer number, that is simply added to the current amount of the credit counter. In case (2), the credit C may be a positive number, preferably an integer number, that is simply subtracted from the current amount of the credit counter. It is also possible to implement the present invention in a manner that the received credit C is used to overwrite the current value held in the credit counter. This is advantageous since it helps to avoid that a computer system accumulates credits over time. Another approach for avoiding accumulation of credit information would be to limit the maximum value the credit counter can take on if the counter decrements the value, or to limit the minimum value the credit counter can take on if the counter increments the value. Likewise, it is also possible to add a time component to an otherwise time-independent credit counter such that after a number of days for example the computer system is blocked no matter what the credit counters value is.

The credit counter is incremented or decremented by a unit at each clock tick of the trusted hardware component's internal oscillator, or each time a specific event occurs.

The computer interrupts its regular operation (regular mode) if the credit counter reaches a certain value or threshold v. v could be any number, e.g. v=0, or v=1000.

If the credit C is a token, then this token may represent a certain credit amount. A token C1 may represent an amount of 100 and a token C2 may represent an amount of 1000, for example. There could be a lookup table in the computer system which returns the actual amount for a token. In another implementation the token may tell the computer system 11 that it is authorized to run for a predefined duration in its regular mode. A token may be good for 24 hours or 1 billion cycles, for example.

Instead of a token or a number, the credit C may represent a pointer. This pointer when received by the computer system 11 points to a table or memory where a credit amount is stored. From this the computer system 11 can derive information that tells it for how long it is supposed or authorized to run in a regular mode.

All the above outlined alternatives are for sake of simplicity herein referred to as updating the credit counter.

If the credit is used up, the computer system switches to a special mode of operation. This special mode of operation depends on the actual implementation. A few examples of special modes are set forth in the below listing:

- the computer system runs in a special mode where its activities are restricted to the sending out the secure identifier E(w,n) to a server module, to the receiving of a signed message S(m) from the server, and to the obtaining of the credit from the received message S(m) for updating its credit counter.
- the computer system may immediately refuse to operate in its regular mode. It then has to be reset, e.g. by somebody who is authorized to do so, before it resumes regular operation.
- the computer system may switch to a special mode where it is not of any use to the current user anymore.
- the computer system may switch to a special mode where it sends out information that can be used for tracking it down. This can involve the use of global positioning information if the computer system has a built in global positioning system (GPS), address information, registry information, routing topology information, etc.
- the computer system may switch to a special mode where it issues an optical and/or acoustic alarm, or where a detector, e.g. a detector at an exit door of an office building, issues an optical and/or acoustic alarm.

The computer system may resume regular operation for a short period of time in order for the system to be able to obtain new credit information from the server module.

Figure 2A:
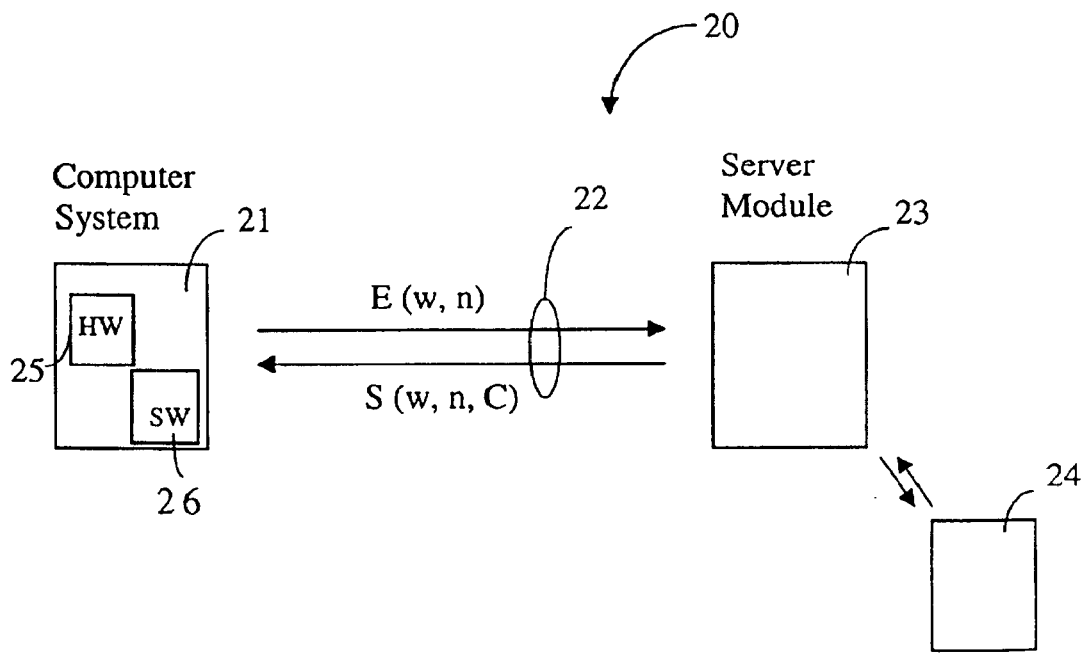
FIG. 2A is a schematic block diagram of a first embodiment, in accordance with the present invention.

Another, more detailed implementation of the present invention is described in connection with FIGS. 2A–2C. FIG. 2A illustrates a communication system 20 with computer system 21, network 22, and server module 23. In the present implementation the computer system 21 comprises a trusted hardware component 25 and a software component 26 (e.g., a software agent). The trusted (tamperproof) hardware component may comprise the ATMEL MSC0402 chip made by Atmel Corporation. This chip is an 8-bit microcontroller (cryptographic processor) with advanced security features. The chip can both store secret keys in nonvolatile memory, and compute public key functions using those secret keys. Among these functions is generation of signatures, secure storage and transmission of various secret keys. The chip protects against many of the kinds of breaches that hackers might use to gain secret information. Additional details about this chip and its functionality can be found at http://www.atmel.com/atmel/acrobatl/1504s.pdf.

Figure 2B:
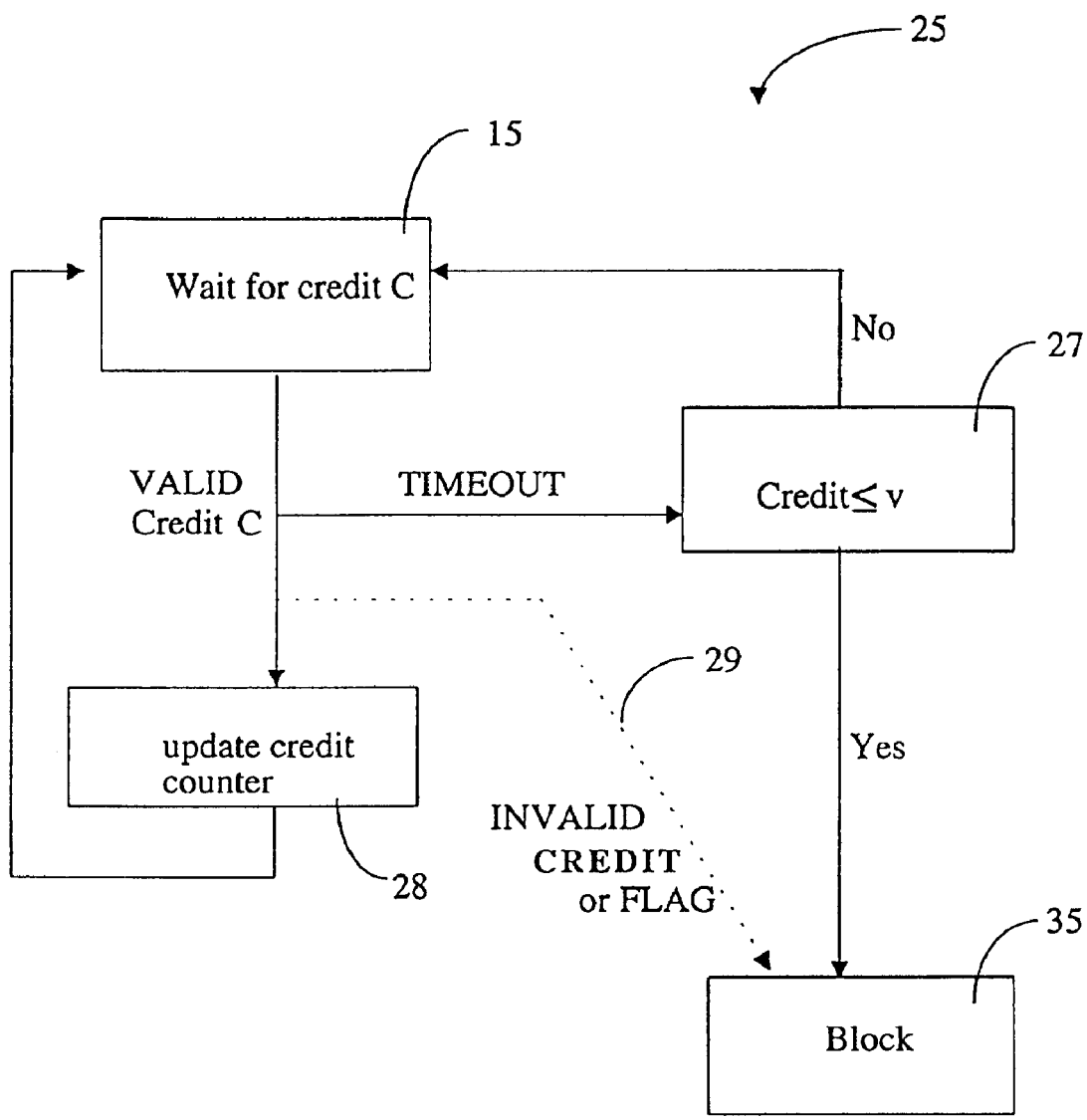
FIG. 2B is a schematic block diagram of the trusted hardware component of a computer system of the first embodiment.
Figure 2C:
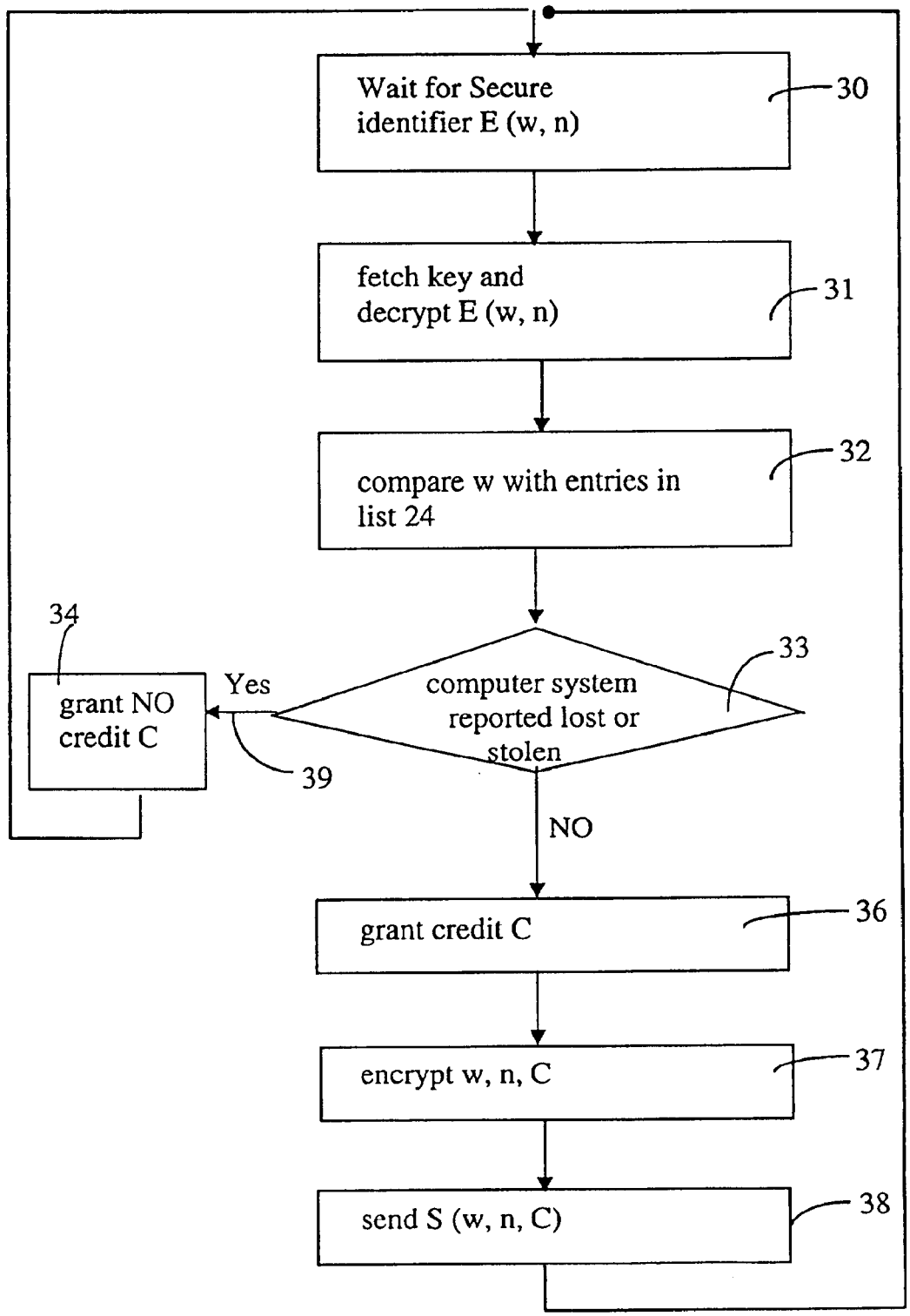
FIG. 2C is a schematic flow chart depicting the steps performed by the server module of the first embodiment.

FIG. 2B is a schematic diagram of the computer system's hardware and FIG. 2C is a schematic diagram of the server module's hardware. Please note that in these Figures only those elements are illustrated which are needed to describe the present invention and its implementation.

The software component 26 is responsible for contacting the trusted server module 23 to obtain a fresh credit C. For this purpose this software component 26 interacts with a transceiver (not shown) and other components of the computer system 21. Before obtaining a fresh credit C, the computer system 21 has to send a challenge E(w,n) to the server module 23. This server module then eventually returns a fresh credit C. After the fresh credit C was received, the software component 26 feeds the credit amount to the trusted hardware component 25. The trusted hardware component 25 allows regular operation of the computer system as long as the credit lasts. After expiration of the credit, the trusted hardware component forces or triggers the computer system 21 to switch to a special mode of operation.

The trusted hardware component 25 may have the following set of capabilities/features/characteristics:

it is able to generate time-based events or other types of events, preferably independent of the rest of the computer system 21;

it securely stores a cryptographic key k, e.g. a public key;

it is able to securely store the computer system's (unique) identifier w;

it is able to encrypt the computer system's identifier w;

it is able to verify signatures made by a server module, e.g. a public key signature for known and trusted public keys;

it is able to force or trigger the computer system 21 to switch to a special mode of operation.

The trusted hardware component also should be able to store and run a small program and associated variables. Here, secure storage means that the expense of modifying securely stored information is higher than the benefits gained from a successful modification.

The computer system's (unique) identifier w has to be stored by the hardware component 25 in a manner that any attempt to break into the computer system 11 is more expensive or damaging than the benefit gained from this activity. In other words, the hardware component has to be a trusted component.

According to the present invention, the software component 26 of the computer system 21 obtains the system's identifier w and additional information n from the hardware component 25. For this purpose the hardware component 25 comprises a building block (not shown) which generates or obtains this additional information n. In the present implementation this building block comprises a random number generator. Such a random number generator can be realized in hardware, software, or a combination of both. Preferably, the random number generator is implemented in a way that it generates unpredictable random numbers n. Each time the computer system 21 sends out a secure identifier E(w,n) to the server module 23 another random number n is used. Whenever the random number n changes also the secure identifier E(w,n) changes. n is employed as additional information to ensure freshness and to prevent replay attacks by somebody who recorded old messages exchanged between the computer system 21 and the server module 23.

The trusted hardware component 25 encrypts the identifier w and the random number n using the cryptographic key k to generate a secure identifier E(w,n), referred to as secure identifier. This secure identifier E(w,n) is then provided by the hardware component 25 to the software component 26.

The software component 26 sends the secure identifier E(w,n) via a transceiver (not shown) and said network 22 to the server module 23. The secure identifier E(w,n) may be sent just before the current credit of the computer system 21 expires, or after a certain predefined time interval. If the computer system 21 is disconnected from the network 22, e.g., because it is used in an island mode, the secure identifier E(w,n) may be sent out the next time the computer system 21 is connected to the network 22.

After the secure identifier E(w,n) was transmitted the computer system 21 now waits for a credit, as indicated in box 15 of FIG. 2B.

The server module 23 waits until it receives a secure identifier E(w,n) via the network 22, illustrated as step 30 in FIG. 2C. It then fetches a key and uses this key to decrypt the secure identifier E(w,n) (step 31). This key may be a secret (private) key, for example. By decryption of the secure identifier E(w,n) the server module 23 obtains the identifier w and the random number n in the clear. In step 32 the server module 23 compares the identifier w with the identifier(s) on a list 24. The server module 23 either comprises a list 24 or it has access to a list where the identifiers of computer systems 21 are listed that are reported lost or stolen. In the present implementation example the list 24 is a 'black list'. If the server module 23 finds a matching entry in the black list it assumes that the computer system 21 from which it just has received the secure identifier E(w,n) was either reported stolen or lost. The flow-chart follows path 39. The server module 23 does not grant the computer system 21 any credit (step 34).

Likewise, the list 24 may be a list that comprises all computer systems that are NOT reported lost or stolen. Such a list 24 is herein referred to as 'valid list'. If the server module 23 finds a matching entry in the valid list it assumes that the computer system 21 from which it just has received the secure identifier E(w,n) was neither reported stolen nor lost. In other words, it assumes that it is OK to grant the computer system credit. Such a valid list may be advantageous in a setup with only a very limited number of computer systems. In the Internet, for example, the number of entries in a valid list would be too large to handle.

Instead of a black list or valid list one can also employ a customized credit list, or any combination of such lists. A customized credit list may contain specific values that should be returned by the server module. This can be used to temporarily override a default credit value, for example.

If the server module 23 determined that the computer system 21 is reported stolen or lost (step 33), then it grants no credit C to the computer system 21 (step 34), as mentioned above. There are two ways to implement this. The server module 23 may simply refuse to send a message S(w,n, C) to the computer system 21 in which case the computer system 21 uses up all of its credit C until C reaches a certain value or threshold v (box 27 in FIG. 2B). Likewise, the server module 23 may send a message S(w,n,C) where (1) C represents a negative credit. The computer system 21 receives the negative credit C and updates its credit counter (box 28 in FIG. 2B). This reduces the available credit and the computer system quickly reaches a state where C reaches the value v (box 27 in FIG. 2B).

(2) C represents a positive credit. The computer system 21 receives the positive credit C and updates its credit counter (box 28 in FIG. 2B). This reduces the available credit by increasing the credit counter's value and the computer system quickly reaches a state where C reaches the value v (box 27 in FIG. 2B).

(3) C equals v (e.g. C=0). The computer system 21 receives C=v and updates its credit counter (box 28 in FIG. 2B) by overwriting its current value. In doing so, the credit counters value immediately reaches v (box 27 in FIG. 2B).

Instead of sending a negative credit, the server module 23 may send an invalid credit or a flag. The computer system recognizes that an invalid credit C or a flag was received and switches from its regular mode of operation to a special mode of operation, as indicated by arrow 29 and box 35 in FIG. 2B.

Assuming now that the secure identifier E(w,n) came from a computer system 21 that is neither reported lost or stolen, the server module 23 grants a credit C. It can either determine the amount of credit C according to certain rules, or it may simply grant a standard amount, or it may pick a suited credit amount from a lookup table. This is depicted as step 36. The credit C may be large for rarely connected computer systems, or small for computer systems in a tightly controlled building or network. The secure identifier E(w,n) may include a suggested credit value c0, as denoted by E(w,n,c0). By sending this suggested credit value c0 the computer system suggests to the server module to use this special value c0 rather than another credit amount.

The credit C may be expressed in absolute time or, preferably, in relative time. The absolute time approach provides for a concise syntax to express rules, such as "work until Oct. 1, 2000". However, the trusted hardware component 25 would have to be able to keep the date, which is a rather complicated and expensive operation since one cannot rely on the clock of the computer system 21 which can be easily manipulated by an adversary. If a relative time scale is used, the trusted hardware component 25 does not need to keep the current date which is a complicated operation. The trusted hardware component 25 does not need to have a notion of date. If a relative time scale is used, then it is sufficient to simply decrement the credit counter at each tick of the trusted hardware component's clock.

As mentioned above, the trusted hardware component 25 may comprise a simple credit counter that is either decremented or incremented at each tick of a clock or at the occurrence of special events.

In a next step 37 the information w,n, C is encrypted. In the present implementation, the server module 23 generates the binary XOR ($\oplus$ is the binary XOR operator) of w and n to obtain H, where H=w$\oplus$n. The XOR combination of n and w is the most secure type of encryption. It is resistant against infinite computer power attacks if n is a random number. Then, the server module 23 concatenates C and H (C is appended to H), as denoted by H||C. Finally, H||C is signed using the server module's secret (private) cryptographic key to obtain the signature of H||C, which is denoted by sign{H||C}. The server module 23 then transmits sign {H||C} via the network 22 to the computer system 21, as indicated in box 38.

By convention, sign{H||C} comprises H||C and sign{H||C}. Please note that in FIGS. 2A and 2C the expression S(w,n,C) represents H||C and sign{H||C} together.

The computer system's trusted hardware component 25 receives H||C and sign{H||C}. It verifies the validity of the received message S(w,n,C), as described in the next section.

Since the trusted hardware component 25 knows w and n, it is now able to take H and to do an XOR operation with n in order to extract w from H||C. This operation can be illustrated by: (w$\oplus$n)$\oplus$n→w, where (w$\oplus$n)=H. If H$\oplus$n==w, then the computer system 21 checks sign{H||C} to determine whether the credit C was granted by the trusted server module 23 (i.e., the computer system 21 checks whether the signature sign{H||C} is valid. If the signature sign {H||C} is valid, then it is clear that the credit C was granted by the trusted server module and the trusted hardware component 25 updates the credit counter (see box 28 of FIG. 2B) and the computer system 21 returns to a mode (box 15) where it waits for the next credit information.

As illustrated in FIG. 2B, the computer system's trusted hardware component 25 may have a timeout feature where the TIMEOUT value (grace period) is a suitable parameter, e.g. in the order of a few minutes, to allow the computer system's software component 26 to contact the server to obtain fresh credit information.

An adversary cannot record and replay previously sent credit information because the hardware component 25 will not accept credit information containing a previously used random number n. Moreover, only a trusted server module can create correctly signed credit information S(w,n,C).

Figure 3A:
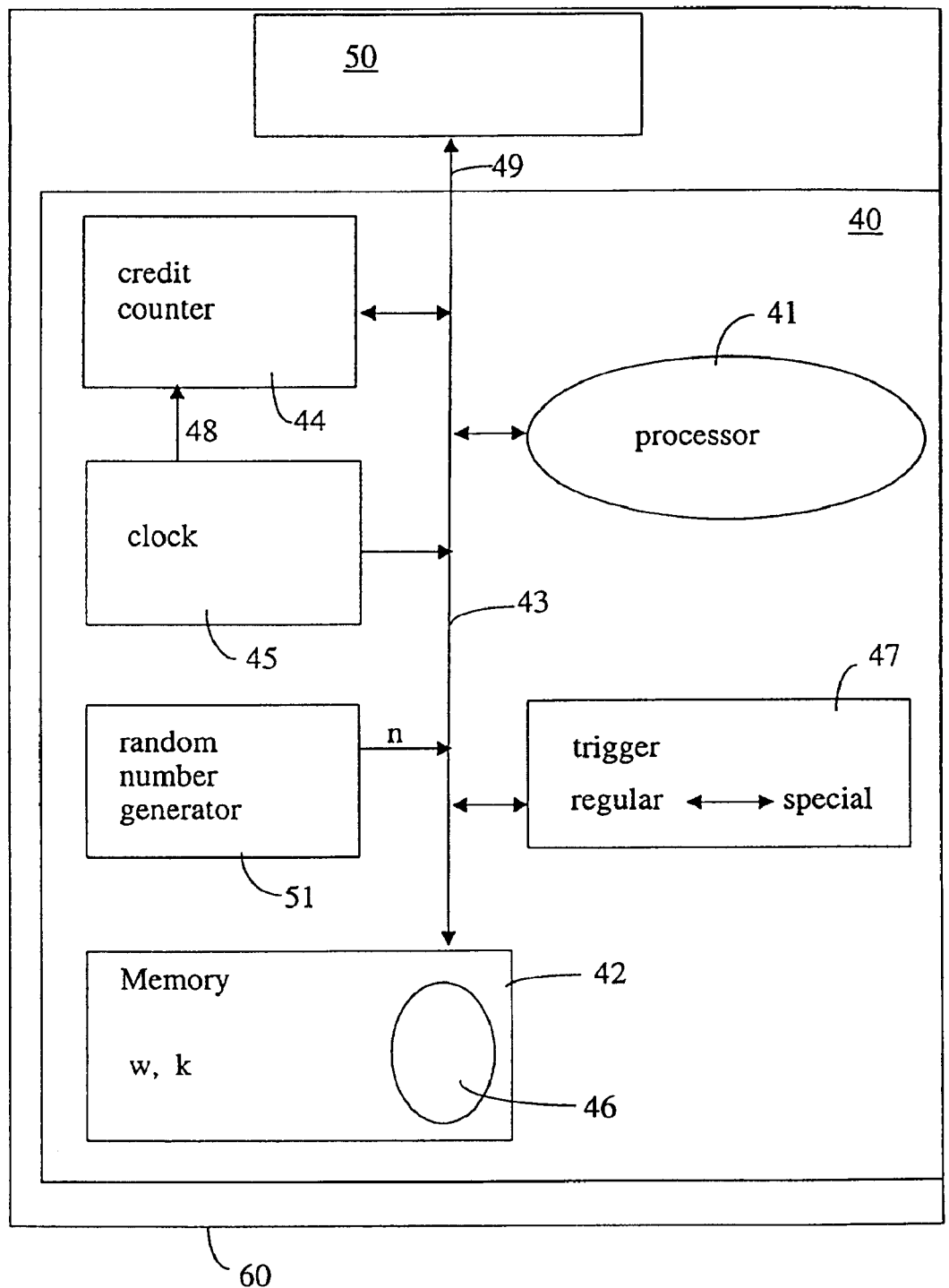
FIG. 3A is a schematic block diagram of another computer system, in accordance with the present invention.

Another embodiment of the present invention is described in connection with FIGS. 3A through 3C. FIG. 3A is a schematic block diagram of a computer system's trusted hardware component 40. It comprises a processor 41, a memory 42 (preferably a non-volatile memory), a bus structure 43, a credit counter 44, a random number generator 51, and a clock generator 45. In the present embodiment there is also a dedicated unit 47 which causes the computer system 60 to switch from its regular mode of operation to a special mode of operation if the credit C is exhausted. Instead of providing a dedicated trigger unit 47 for this purpose, one may implement this such that the processor 41, for example, causes the computer system to switch from its regular mode of operation to a special mode of operation. The processor 41 executes a small program 46 that sits in the memory 42. This memory also securely stores the computer system's identifier w and the cryptographic key k. The clock generator 45 generates clock pulses that are independent from the computer system. These clock pulses are fed via line 48 to the credit counter. This credit counter decrements its current value by a unit. The trigger unit 47 detects via the bus 43 when the credit is exhausted. The trusted hardware component 40 interfaces via a port 49 with the computer system's software component 50.

Figure 3B:
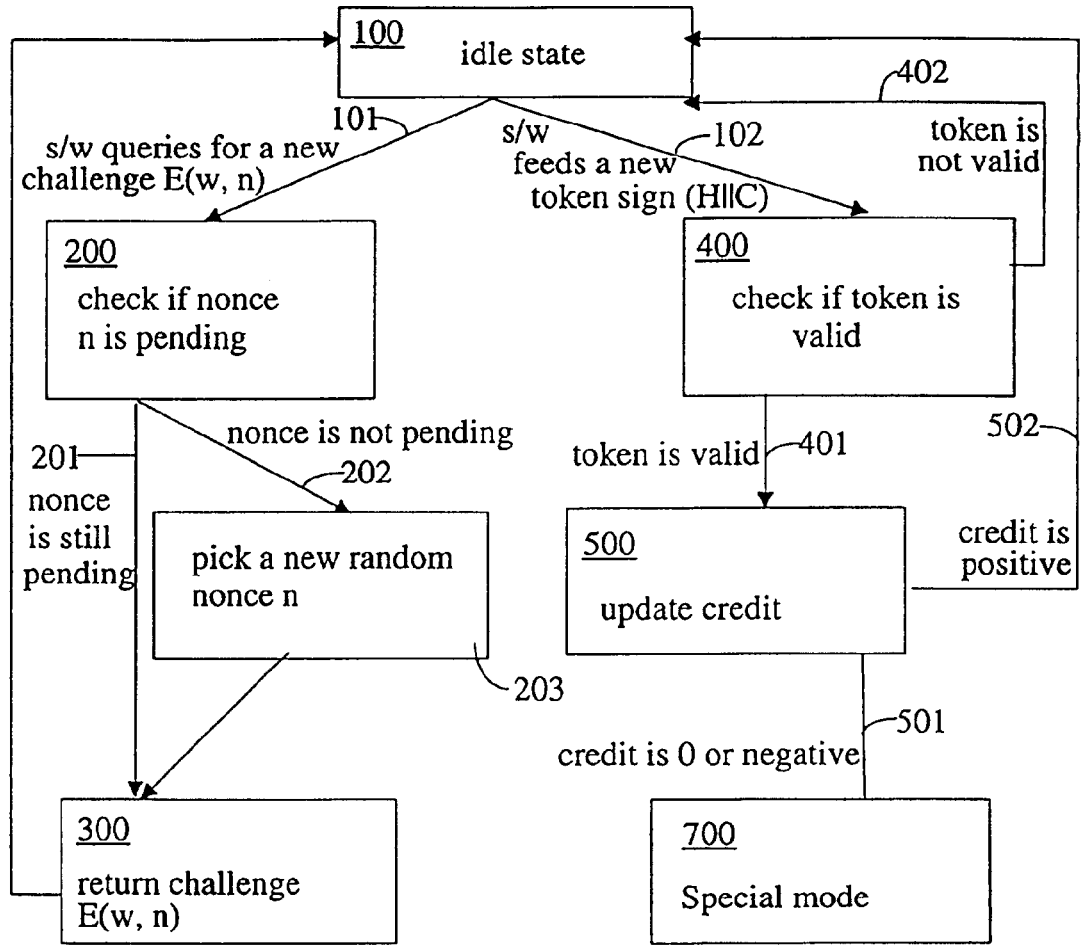
FIG. 3B is a schematic flow chart depicting the steps performed by the computer system of FIG. 3A.
Figure 3C:
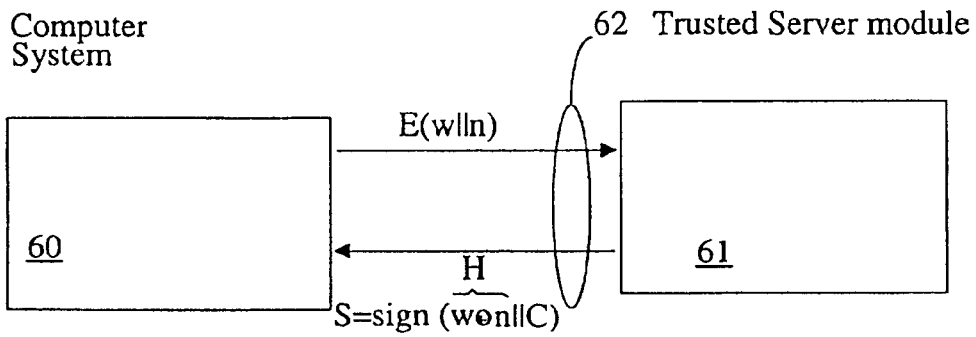
FIG. 3C is a schematic block diagram depicting the exchange between the computer system of FIG. 3A and a server module.

Assuming now that the computer system 60 is in its regular mode of operation and that the current credit is about to be exhausted, the computer system's software component 50 queries (newQuery routine) the hardware component 40 for a new challenge E(w,n) (reference number 101 in FIG. 3B). Note that in the present example a nonce n is used as additional information. The hardware component 40 checks whether a nonce n is pending (reference number 200). If the nonce n is not pending (reference number 202), then the hardware component 40 makes a new random nonce n (reference number 203) available to the processor 41. This random number is generated by a random number generator 51. The random number generator can be implemented in hardware, software, or a combination of hardware and software. Preferably, n must be kept secret, because otherwise a hacker who knows n could derive w in the response H||C. One way to achieve this is to generate n inside the trusted hardware component and to encrypt it together with the identifier w before it leaves the trusted hardware component.

The processor 41 then fetches the identifier w and key k from the memory 42 and generates a secure identifier E(w,n) by encryption of the identifier w and nonce n with the key k. This secure identifier E(w,n) is returned to the software component 50 via bus 43 (reference number 300) and the trusted hardware component 40 returns to an idle state (reference number 100).

If a nonce n from a previous challenge is still pending, e.g. because no response was received from the server module 61, then no new nonce n is picked. Instead, the trusted hardware component 40 returns the previously used secure identifier E(w,n) to the software component 50.

Each time the software component 50 receives a new token sign{H||C} from the server module 61, it sends this new token sign{H||C} via port 49 to the trusted hardware component 40 (reference number 102) (newToken routine). The processor 41 checks whether this new token sign{H||C} is valid (reference number 400). If this token is valid (reference number 401), then the processor 41 causes the credit counter 44 to be updated (reference number 500). If the token is not valid, then the trusted hardware component 40 returns to an idle state (reference numbers 402 and 100).

As long as the credit is not exhausted, i.e., if the credit is positive in the present example, the trusted hardware component 40 returns to an idle state (reference numbers 502 and 100). If the credit counter 44 reaches 0 or assumes a negative value (e.g. after an update with a negative credit), then the trigger unit 47 triggers or forces the computer system 60 to switch from the regular mode of operation into a special mode of operation (reference numbers 501 and 700).

More details of this embodiment are given in the following sections. As mentioned earlier, after a valid token sign{H||C} was fed to the trusted hardware component 40 by the software component 50, the computer system 60 remains in its regular mode of operation as long as the credit counter's amount is positive. At a safe margin prior to the expiry of the credit, the software component 50 calls the newQuery routine in the trusted hardware component 40. This routine returns a secure identifier E(w,n) via bus 43 to the software component 50 (reference number 300), where n is a nonce generated by the random number generator 51, w the computer system's identifier, and E denotes public-key encryption with the server's key k. The software component 50 forwards this secure identifier E(w,n) via the computer system's transceiver and the network 62 to which it is attached to a server module 61.

Whenever this server module 61 replies with a token sign{H||C}, this token sign{H||C} is forwarded by the software component 50 to the trusted hardware component 40 by calling a so-called newToken routine.

The server module's reply comprises a signature on H=w⊕n (by convention, a signature also includes the signed message in the clear) concatenated with a new credit C. This reply is referred to as token H||C. If the computer system which requested a fresh credit is reported lost or stolen, then the value of the credit C is zero, for example. Otherwise, the credit C is a positive integer a whose exact value is rule dependent. This exchange between the computer system 60 and server module 61 is summarized in FIG. 3C.

The newToken routine accepts a new token if it bears a valid signature and it checks whether H⊕n=w, where n is the nonce generated by the previous call to the newQuery routine. This check ensures that an adversary cannot replay (replay attack) previously sent tokens. The credit counter 44 is updated with C if the token bears a valid signature. As discussed before, there are different approaches for the updating of a credit counter conceivable. One can update the credit counter by simply add the new credit amount C to the counter's current credit amount. Likewise, one can update the credit counter by overwriting its current amount with the new credit amount received. Here we update the credit counter by overwriting its current amount. If the computer system 60 was stolen, the server module sets the credit to 0 (C=0).

The computer system's identifier w is only revealed to the server module 61. Assuming the nonce n is of the same bit-length as w, XOR-ing is secure against any adversary even with infinite computing power. No computationally-bounded adversary nor the software component 50 can retrieve w from E(w||n), without knowing the trusted server's private key k.

An example of the software 46 that the trusted hardware component runs is illustrated in the following. In this example, we assume an oscillator to be available inside the trusted hardware component. The code could be adapted to accommodate other types of events. The code is written in pseudo-code akin to the C language. Note that in the above example, wantedID is the computer system's identifier w and pendingNonce is the nonce n.

From line 1 to 6, the code declares a few variables. The rest of the code is structured into three functions, namely clockTick, newQuery, newToken.

From line 9 to 16, the clockTick function is defined. It is called at each clock tick, assumed to be at intervals of one second each. This function first decrements the amount of available credit (line 10). If the grace period has not already elapsed (line 12), it increments the grace period counter (line 13). Otherwise, it proceeds to check if the amount of available credit is less or equal to zero (line 14). In case no credit is left, then the computer system is shut down (line 15).

From line 19 to 23, the newQuery function is defined. It returns the result of the encryption of the current nonce n and the wantedID w (line 22). In case the software calls newQuery before feeding the server module's response, one re-uses the previous nonce n. Otherwise, one generates a new nonce n (line 21). This is required to prevent a cumulative token attack. Incidentally, this also keeps the memory footprint small because one never has to remember more than one nonce.

From line 26 to 38, the newToken function is defined. It is called by the software component to feed the answer of the server module to the trusted hardware component. This function takes a message m and a signature on the message. The code assumes that m is composed of a 128 bit unsigned integer H, followed by a 32 bit integer C. I the present example C-style pointer arithmetic is used to retrieve these values (line 27).

On line 28, one checks if the server module's purported answer XOR-ed with the nonce n matches the wantedID w. This check prevents replay attacks. Only if this inexpensive check succeeds does one proceed to verify the signature, a relatively expensive operation (line 29).

On line 30, when it is clear that the token is signed and fresh, the pendingNonce value is reset. On line 31, one retrieves the value of C from the message On line 32 one sets the credit counter. A zero value of C (line 34) indicates that the computer system is blacklisted and needs to be brought down (line 35).

```
1   uint128 wantedID;
2   int32 credit;
3   uint128 pendingNonce;
4   int32 gracePeriodCounter = 0;
5   //GRACE PERIOD is set to 10 min
6   int32 const GRACE_PERIOD = 600;
7
8   // Called at each clock tick (i.e. each second).
9   void clockTick( ) {
10      credit—;
11      // Check for credit only after the grace period has elapsed.
12      if(gracePeriodCounter < GRACE_PERIOD)
13          gracePeriodCounter++;
14      else if(credit <= 0)
15          blockMachine( );
16  }
17
18  // Called by the software component.
19  char* newQuery( ) {
20      if(pendingNonce == NULL)
21          pendingNonce = generateNonce( );
22      return E(wantedID, pendingNonce);
23  }
24
25  // Called by the software component.
26  void newToken(char* m, BigInteger signature) {
27      uint128 H = *((uint128*) m);
28      if((H ^ pendingNonce) == wantedID) {
29          if(isValidServerSignature(m, signature)) {
30              pendingNonce = NULL;
31              int c = *((int32*) ((uint128*) m+1));
32              credit = c;
33              // Check if device is stolen
34              if(c <= 0)
35                  blockMachine( );
36          }
37      }
38  }
```

A computer system according to the present invention may comprise a display which indicates to the user how much credit is left. The status of the credit counter could for example be displayed graphically.

Devices according to the present invention do not necessarily have to have identical implementations (from a software and/or hardware point of view) as long as at least the present scheme for announcement of the identity information, the receiving of credit information, and the updating of a counter is implemented in these devices.

The present scheme is based on the assumption that a computer device to be protected is occasionally connected to a network. This network connectivity is becoming more and more a must. A theft-protection scheme in order for it to be accepted in the market place cannot be kept secret. It is thus likely that people will try to disable the protection scheme. The present hybrid approach is very well protected against any tampering.

Computer systems are, according to the present invention, resistant against data filtering between the computer system and the server module. Indeed, a stolen or lost machine will run until its current line of credit expires and no more. Filtering by an adversary may prevent the computer device from shutting down earlier, when the server module sends a zero valued credit token (C=0). The software component of the protected computer system can be untrusted. The only trusted component of the protected computer system is the hardware component. Moreover, the security requirements and capabilities of the hardware component are simple and yet well defined.

Certain computer systems, such as print servers or file servers, require to be connected permanently. These computer systems can be protected by granting them small credits only which means that they switch into a special mode of operation right after they are disconnected for a certain period of time.

The ability to control a protected computer system through an independent server module essentially offers a level of indirection, hence increased flexibility. Consider a case of an organization owning a large number of computing devices. A device is assigned to a user who is a member of this organization. The current common approach is to password protect the computer systems. Typically, it is the assigned user who chooses the password. When the computer system is claimed to be stolen, for example, it is hard for the organization to distinguish between theft by the assigned user (who is feigning theft) and theft by another individual. Indeed, the assigned user who happens to know the password can continue to use the computer system after the "theft".

The present approach prevents this attack. The organization has to add the computer system's identifier w to the list of lost or stolen devices (black-list). The computer system would run out of credit after a while and hence become useless.

The same approach can be applied to devices which often change hands, in particular rented vehicles (e.g., cars) or other devices.

Moreover, the present invention can be used with computer systems where password protection is not applicable because they lack a keyboard or screen. Lazy but otherwise honest users, which fail to set a password on a computer device assigned to them, are also protected. In particular, many mobile phone users or personal digital assistant (PDAs) users can benefit from the present invention.

The present scheme guarantees privacy since the trusted hardware component never communicates the computer system's identifier w to the software component in the clear. Furthermore, the present scheme just encrypts small sized identifiers w and hence does not fall under export control as would be the case if bulk-encryption was used.

Figure 4A:
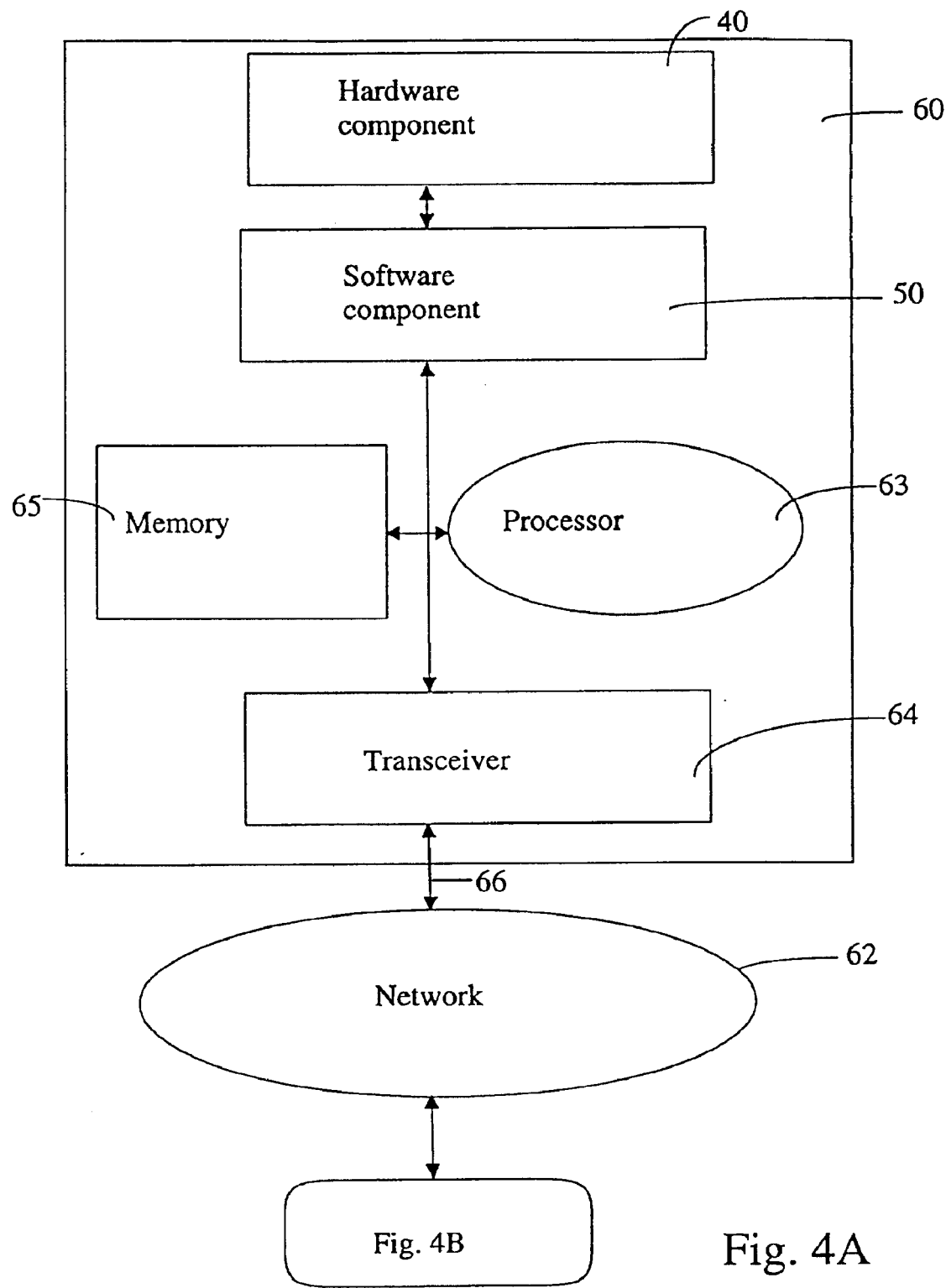
FIG. 4A is a schematic block diagram of another computer system, in accordance with the present invention.
Figure 4B:
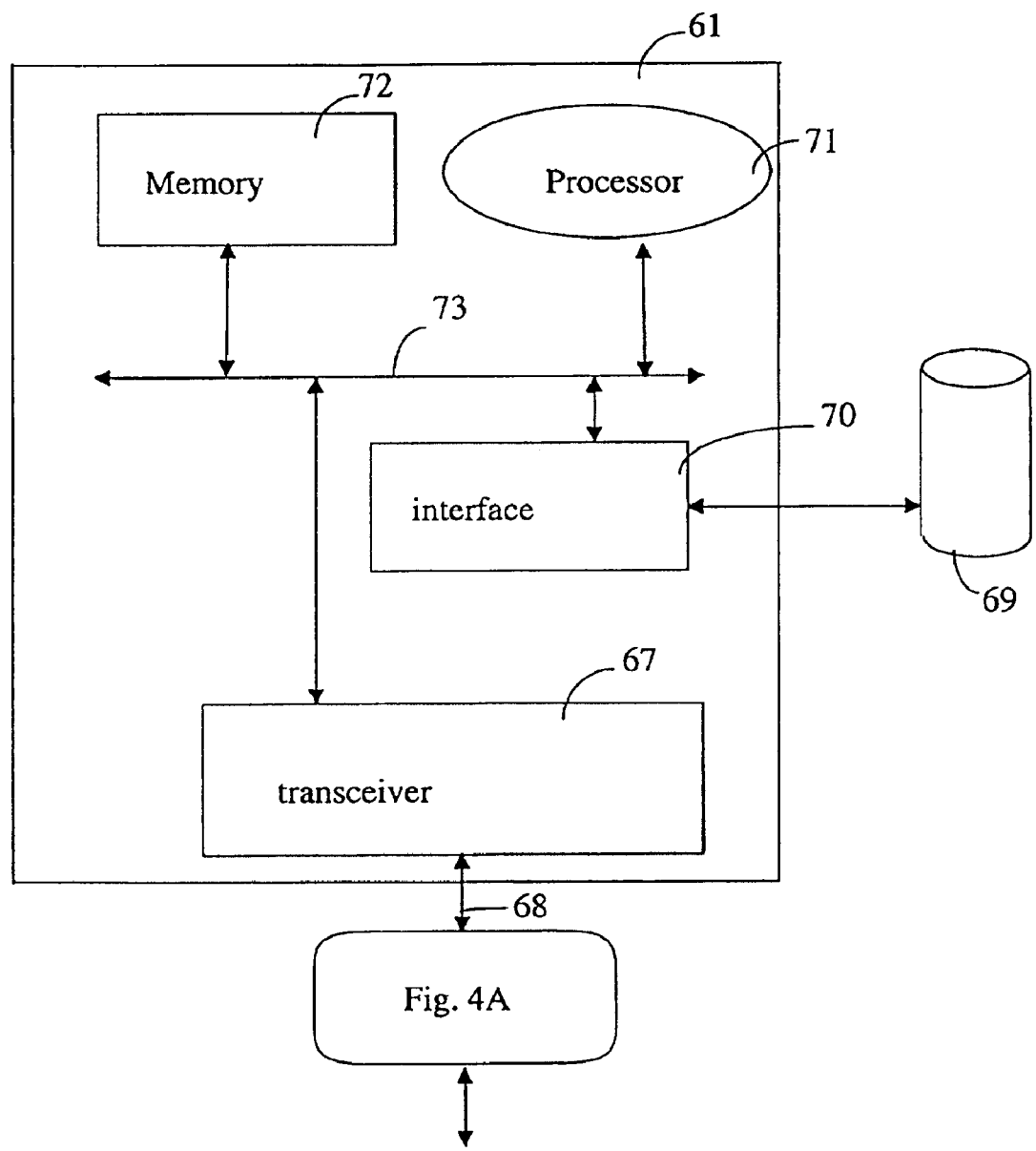
FIG. 4B is a schematic block diagram of a server module, in accordance with the present invention.

A computer system 60, in accordance with the present invention, might comprise the building blocks illustrated in FIG. 4A, and a server module 61 might comprise the building blocks illustrated in FIG. 4B. The computer system 60 has a network interface unit (transceiver) 64, a software component 50, a trusted hardware component 40, a processor 63 and a memory (RAM, DRAM, ROM, CD-ROM, or any combination thereof) 65. The software component 50 may comprise computer code which, when being executed by the processor 63, performs the basic method steps according to the present invention. The network interface unit 64 typically comprises a transceiver (e.g. composed of a transmitter and a receiver) which is used to send information via a port 66 to the network 62 and to receive information from the network 62 via the port 66. The network interface unit's transmitter (not shown) sends information via a port 66 through the network 62 to a server module 61, and the network interface unit's receiver (not shown) receives through the port 66 information from the server module 61. Note that the network interface unit 64 can be any kind of unit (including broadcast unit), for interfacing with a fiber channel, an IR channel, or RF channel, for example. It is conceivable that the transmitter and receiver operate on different types of channels, such as an IR channel or RF channel.

The computer system 60 may be a general purpose computer (e.g., a palm top computer), or a special purpose computer system, e.g. a computer on a board.

In addition to the above described elements/units the computer system 60 may comprise other elements/units, such as a power supply or battery. For sake of simplicity, these elements/units are not shown in FIG. 4A.

The server module 61, in accordance with the present invention, might comprise the following building blocks, as illustrated in FIG. 4B: a port 68 connected to or being part of the network 62, a network interface unit 67 (e.g. composed of a transmitter and a receiver), a bus structure 73 (note that this bus structure may comprise several buses), a processor 71, a memory (RAM, DRAM, ROM, CD-ROM, or any combination thereof) 72, an interface unit 70, and an external storage medium 69 (e.g., a disk drive or tape drive). In the present embodiment, the list (black-list, valid list, or customized credit list) is stored on the storage medium 69. The server module 61 may be a general purpose server, a special purpose server, a server farm, a logical sever module in a server, or the like.

Note that FIGS. 4A and 4B do not represent all elements of fully functional systems. Somebody skilled in the art is able to implement the present scheme in various computer systems and server modules.

It is understood by those skilled in the art that at the present time some communications protocols are still in draft status. The present scheme is independent of any particular protocol and can be used in connection with many such protocols. Somebody skilled in the art is able to implement the present scheme in existing protocol environments as well as in protocol environments under development or yet to be developed.

Many computer systems require network access because they draw part or all of their functionality from the network which means that somebody who found the computer system or who uses it after it was stolen will sooner or later connect to the network. The present scheme then will send out the system's identity information to a specific server module. This server module determines whether the computer system was lost or stolen and then triggers an action. The present scheme cannot be disabled on the protected computer system without loosing considerable functionality.

The present scheme could be implemented 100% in hardware such that it is independent of the operating system (OS). This could be done by means of a field programmable gate array (FPGA), for example. If one changes the OS, the present scheme is still functional. Even a reconfiguration of the whole system will not inactivate the present scheme. This can be achieved by hardwiring or programming a chip or component of the computer system to contain the secure identifier and run the appropriate exchanges with the server module. That component or chip must be able to look at data exchanged with the network interface(s).

Several examples of actions that can be taken if a stolen or lost computer system requests a fresh credit were discussed above. It is obvious that this list of actions is non-exhaustive. Different business models could be developed around the present invention. The more expensive a device is, the more likely it is that the tracking of the stolen or lost system makes sense.

One could use a trace route mechanism to track down the path to the computer system that was discovered.

Stolen devices—once detected—can participate to identify and/or locate the thief or current user silently.

The real owner of a computer system could be notified. The police or another organization could be engaged to track the computer system.

The Internet Service Provider through whom the discovered computer system is used can be contacted to take action, e.g. by inactivating the respective account.

Stolen computer systems once detected can be refused access to sensitive services, like internet-banking. This is particularly useful since portable computer systems very often contain private information on bank accounts.

A feature in the stolen or lost computer system could be activated which destroys the whole system or part thereof to make it unusable. This is a good solution for systems which are not expensive because tracking down such a system might be too expensive. The real owner might be furnished with a password or key which allows him to reactivate the computer system that was made unusable.

a global positioning system (GPS), if available in the lost or stolen computer system, can be activated to enable the tracking of it by transmitting coordinates describing the systems position. A typical example is a mobile phone or a vehicle with a GPS.

The computer system can be triggered to send configuration information to the server module, or to a third party, e.g. the police. As part of the configuration information the user name, Internet service provider numbers, phone number, and IP address can be transmitted.

The computer system can be caused to show an alert screen, or the sound system can be employed to activate an alarm signal.

An alert message can be appended to e-mails that are sent out from the computer system.

An alert message could be inserted in the HTTP request header field of HTTP requests to notify somebody.

The server module can send information back to the computer system to cause the system to perform certain functions. This information is transmitted in encrypted form.

Other schemes are conceivable that allow silently to find or identify the thief or user who found a computer system Preferably, the cryptographic key k is put in the computer system's trusted hardware component together with the identifier w at manufacturing time of either the trusted hardware component or the computer system.

It is possible to have several components of a computer system protected by the present scheme. In a desktop computer, for example, one may protect the motherboard with a first trusted hardware component and a graphics board (or any other expensive part) with a second trusted hardware component.

A computer program or computer program means in the present context mean any expression, in any language, code or notation, of a set of instructions intended to cause a device having an information processing capability to perform a particular function either directly or after either or both of the following a) conversion to another language, code or notation; b) reproduction in a different material form.

Besides the already described embodiments the present scheme can also be implemented using a broadcast facility for computer systems that are connected to a broadcast network.

It is an advantage of the present scheme that it cannot be disabled without having the functionality of the stolen computer system significantly reduced, if not totally.

Theft of protected computer systems becomes therefore practically pointless.

What is claimed is:

1. Method for switching a computer system (11; 21; 60), which is connectable via a communication interface (64) and a network (12; 22; 62) to a server module (13; 23; 61), into a special mode of operation, the method comprising the steps:
   a. exhausting step-by-step a credit of a credit counter (44) of the computer system (11; 21; 60);
   b. switching the computer system (11; 21; 60) into the special mode of operation if the credit is exhausted;
   c. sending an identifier (w) assigned to the computer system (11; 21; 60) via the communication interface (64) and the network (12; 22; 62) to the server module (13; 23; 61);
   d. receiving a token (S) issued by the server module (13; 23; 61);
   e. verifying the validity of the token (S); and
   f. if the token (S) is valid, then extracting a credit (C) from the token (S) and updating the credit counter (44) with the credit (C).

2. The method of claim 1, whereby the computer system (11; 21; 60) is caused to switch into the special mode of operation if step e. reveals that the token (S) is invalid.

3. The method of claim 2, whereby the special mode of operation is a mode of operation where:
   the computer system (11; 21; 60) or part(s) thereof are inactivated; or
   certain services provided by the computer system (11; 21; 60) are canceled; or
   the computer system's (11; 21; 60) access to sensitive services is refused; or
   the computer system (11; 21; 60) shows an alert screen or issues an alarm; or
   the computer system (11; 21; 60) causes an alert message to be sent out; or
   software of the computer system (11; 21; 60), or part of the software, is rendered useless.

4. The method of claim 1, whereby the computer system (11; 21; 60) continues with step c. if step e. reveals that the token (S) is invalid.

5. The method of claim 1, whereby step c. is carried out before the credit counter (44) reaches a predefined value or threshold (v).

6. The method of claim 5, whereby the predefined value or threshold is zero (v=0).

7. The method of claim 1, whereby the validity of said token (S) is verified by checking whether the token (S) comprises a signature of the server module (13; 23; 61).

8. The method of claim 1, whereby the credit counter (44) is updated by adding the credit (C).

9. The method of claim 1, whereby the credit counter (44) is updated by overwriting it with the credit (C).

10. The method of claim 1, whereby the identifier (w) is unique within the network (12; 22; 62).

11. The method of claim 1, whereby the computer system (11; 21; 60) is switched into the special mode of operation if the computer system (11; 21; 60) was reported lost or stolen.

12. The method of claim 1, whereby step c. comprises the steps:
   generating additional information (n);
   encrypting the identifier (w) and the additional information (n) to generate a secure identifier (E) using a cryptographic key (k).

13. The method of claim 12, whereby the cryptographic key (k) is a secret cryptographic key, preferably a cryptographic key of a public encryption scheme.

14. The method of claim 12, whereby the additional information (n) is a random number, preferably an unpredictable random number.

15. Method in a system (13; 23; 61) that is connectable via a network interface (67) and a network (12; 22; 62, 66, 68) to a computer system (11; 21; 60), the method comprising the steps:
   receiving an identifier (w) from the computer system (11; 21; 60) via the network (12; 22; 62, 66, 68) and the network interface (67);
   comparing the identifier (w) with a list (14; 24) of identifiers (w) to determine whether the identifier (w) originates from a computer system (11; 21; 60) that was reported lost or stolen;
   if the identifier (w) originates from a computer system (11; 21; 60) that was not reported lost or stolen, then generating a token (S) which comprises the identifier (w) and a credit C, signing the token (S) using a cryptographic key to create a signed token (S), and sending the signed token (S) via the network interface (67) and the network (12; 22; 62, 66, 68) to the computer system (11; 21; 60).

16. The method of claim 15, whereby the following step is carried out if the identifier (w) originates from a computer system (11; 21; 60) that was reported lost or stolen:
   generating a token (S) which comprises the identifier (w) and a credit revocation, signing the token (S) using the cryptographic key to create a signed token (S), and sending the signed token (S) via the network interface (67) and the network (12; 22; 62, 66, 68) to the computer system (11; 21; 60).

17. The method of claim 16, whereby the credit revocation is a negative credit amount.

18. The method of claim 16, whereby the system is a server or server module.

19. The method of claim 16, whereby the list (14; 24) of identifiers (w) is a black-list which comprises the identifier (w) of a plurality of computer systems that are reported lost or stolen.

20. The method of claim 16, whereby the list (14; 24) of identifiers (w) is a valid list which comprises the identifier (w) of a plurality of computer systems that are not reported lost or stolen.

21. The method of claim 16, whereby the system applies predefined rules when generating a token (S) which comprises the identifier (w) and a credit C.

22. The method of claim 16, whereby the signed token (S) comprises additional information (n) that was received from the computer system (11; 21; 60) together with the identifier (w).

23. The method of claim 22, whereby the step of generating a token (S) comprises the steps:
   generating the binary XOR (H) of the identifier (w) and the additional information (n).

24. The method of claim 23, whereby the step of generating a token (S) comprises the steps:
   concatenating the binary XOR (H) and the credit (C) to generate the concatenation (H∥C); and
   creating the signed token (S) by signing the concatenation (H∥C) using the cryptographic key.

25. The method of claim 15, whereby the cryptographic key is a public key.

26. Apparatus comprising:
- a communication interface (64) for connecting the apparatus (11; 21; 60) via a network (12; 22; 62) to a server module (13; 23; 61),
- a software component (26; 50) for sending an identifier (w) assigned to the apparatus (11; 21; 60) via the communication interface (64) and the network (12; 22; 62) to the server module (13; 23; 61), and for receiving a token (S), issued by the server module (13; 23; 61), whereby the token (S) comprises a credit (C);
- a trusted hardware component (25; 40) storing the identifier (w) and comprising a credit counter (44) with a credit
  - which is automatically exhaustible step-by-step by the apparatus (11; 21; 60); and
  - which is updateable with the credit (C);
- a trigger unit (25; 47) for switching the apparatus (11; 21; 60) into a special mode of operation if the credit of the credit counter (44) is exhausted.

27. The apparatus of claim 26, wherein the communication interface (64) comprises a transmitter and a receiver.

28. The apparatus of claim 26, wherein the trusted hardware component (25; 40) also stores a cryptographic key (k).

29. The apparatus of claim 28, wherein the software component (26; 50) encrypts the identifier (w) using the cryptographic key (k) prior to sending the identifier (w).

30. The apparatus of claim 26, wherein the trusted hardware component (25; 40) further comprises a unit for generating additional information (n).

31. The apparatus of claim 30, wherein unit for generating additional information (n) is a random number generator and where the additional information (n) is a random number, preferably an unpredictable random number.

32. The apparatus of claim 26 being part of a computer system.

33. The apparatus of claim 26 being part of a mobile computer system or part of a vehicle, such as a rental car.

34. Apparatus comprising:
- a network interface (67) for connecting the apparatus (13; 23; 61) via a network (12; 22; 62, 66, 68) to a computer system (11; 21; 60);
- a processor (71);
- a memory (72) with code which, when being executed by the processor (71), performs the steps:
  - receiving an identifier (w) from the computer system (11; 21; 60) via the network (12; 22; 62, 66, 68) and the network interface (67);
  - comparing the identifier (w) with a list (14; 24) of identifiers (w) to determine whether the identifier (w) originates from a computer system (11; 21; 60) that was reported lost or stolen; and
    - if the identifier (w) originates from a computer system (11; 21; 60) that was not reported lost or stolen, then generating a token (S) which comprises the identifier (w) and a credit (C), signing the token (S) using a cryptographic key to create a signed token (S), and sending the signed token (S) via the network interface (67) and the network (12; 22; 62, 66, 68) to the computer system (11; 21; 60).

35. The apparatus of claim 34, whereby the credit (C) is a revocation credit.

36. The apparatus of claim 34, whereby the apparatus is part of a server or server module.

37. The apparatus of claim 34, whereby the cryptographic key is a public key.

38. The apparatus of claim 34, whereby the list (14; 24) of identifiers (w) is a black-list which comprises the identifier (w) of a plurality of computer systems that are reported lost or stolen.

39. The apparatus of claim 34, whereby the list (14; 24) of identifiers (w) is a valid list which comprises the identifier (w) of a plurality of computer systems that are not reported lost or stolen.

40. A computer program product comprising a computer readable medium, having thereon:
- computer program code means, when said program is loaded in a computer system (11; 21; 60), which comprises a communication interface (64) for connection via a network (12; 22; 62) to a server module (13; 23; 61), execute procedure to
  - a. exhaust step-by-step a credit of a credit counter (44) of the computer system (11; 21; 60);
  - b. switch the computer system (11; 21; 60) into the special mode of operation if the credit is exhausted;
  - c. send an identifier (w) assigned to the computer system (11; 21; 60) via the communication interface (64) and the network (12; 22; 62) to the server module (13; 23; 61);
  - d. receive a token (S) issued by the server module (13; 23; 61);
  - e. verify the validity of the token (S); and
  - f. if the token (S) is valid, then extract a credit (C) from the token (S) and updating the credit counter (44) with the credit (C).

41. The computer program product of claim 40, whereby the computer system (11; 21; 60) is caused to switch into the special mode of operation if step e. reveals that the token (S) is invalid.

42. The computer program product of claim 40, whereby the computer system (11; 21; 60) continues with step c. if step e. reveals that the token (S) is invalid.

43. A computer program element comprising:
- computer program code means to make a computer system (11; 21; 60), which comprises a communication interface (64) for connection via a network (12; 22; 62) to a server module (13; 23; 61), execute procedure to
  - a. exhaust step-by-step a credit of a credit counter (44) of the computer system (11; 21; 60);
  - b. switch the computer system (11; 21; 60) into the special mode of operation if the credit is exhausted;
  - c. send an identifier (w) assigned to the computer system (11; 21; 60) via the communication interface (64) and the network (12; 22; 62) to the server module (13; 23; 61);
  - d. receive a token (S) issued by the server module (13; 23; 61);
  - e. verify the validity of the token (S); and
  - f. if the token (S) is valid, then extract a credit (C) from the token (S) and updating the credit counter (44) with the credit (C).

44. A computer program product comprising a computer readable medium, having thereon:
- computer program code means, when said program is loaded in a server (11; 21; 60), which comprises a network interface (67) for connection via a network (12; 22; 62, 66, 68) to a computer system (11; 21; 60), execute procedure to
  - receive an identifier (w) from the computer system (11; 21; 60) via the network (12; 22; 62, 66, 68) and the network interface (67);

compare the identifier (w) with a list (14; 24) of identifiers (w) to determine whether the identifier (w) originates from a computer system (11; 21; 60) that was reported lost or stolen;

if the identifier (w) originates from a computer system (11; 21; 60) that was not reported lost or stolen, then generating a token (S) which comprises the identifier (w) and a credit C, signing the token (S) using a cryptographic key to create a signed token (S), and sending the signed token (S) via the network interface (67) and the network (12; 22; 62, 66, 68) to the computer system (11; 21; 60).

45. A computer program element comprising:

computer program code means to make a server (11; 21; 60), which comprises a network interface (67) for connection via a network (12; 22; 62, 66, 68) to a computer system (11; 21; 60), execute procedure to receive an identifier (w) from the computer system (11; 21; 60) via the network (12; 22; 62, 66, 68) and the network interface (67);

compare the identifier (w) with a list (14; 24) of identifiers (w) to determine whether the identifier (w) originates from a computer system (11; 21; 60) that was reported lost or stolen;

if the identifier (w) originates from a computer system (11; 21; 60) that was not reported lost or stolen, then generating a token (S) which comprises the identifier (w) and a credit C, signing the token (S) using a cryptographic key to create a signed token (S), and sending the signed token (S) via the network interface (67) and the network (12; 22; 62, 66, 68) to the computer system (11; 21; 60).

\* \* \* \* \*